Figure 1:
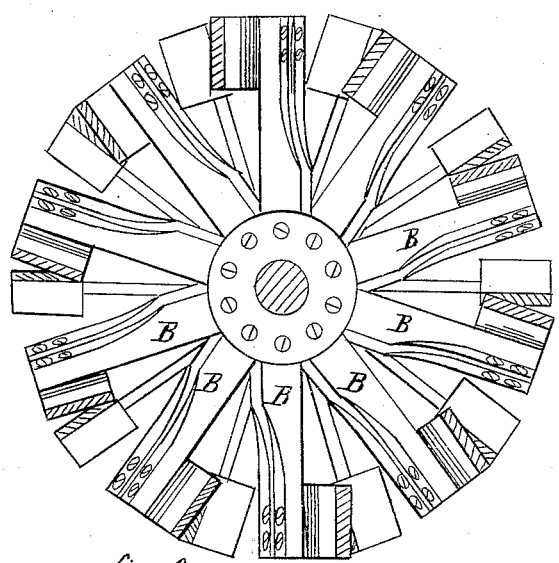
Figure 2:
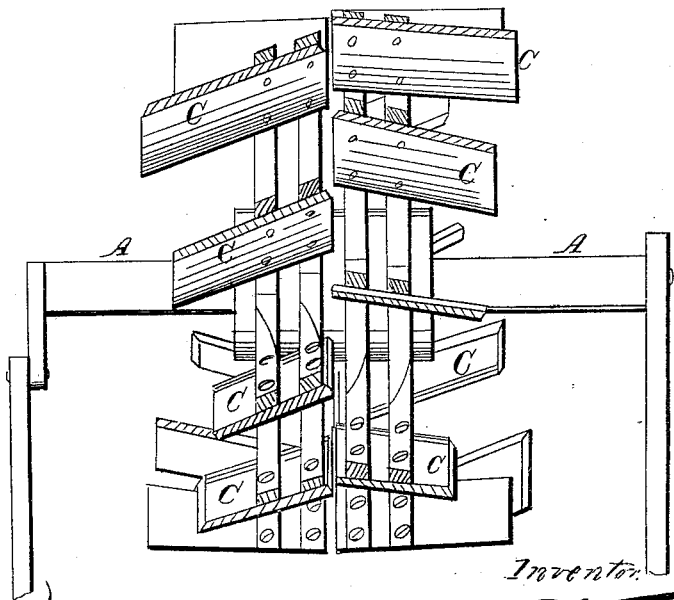

E. Matteson,
Paddle Wheel.

No. 65,495.   Patented June. 4, 1867.

Witnesses

Inventor

United States Patent Office.

ELISHA MATTESON, OF SOUTH BROOKLYN, NEW YORK.

Letters Patent No. 65,495, dated June 4, 1867.

---

IMPROVED PADDLE-WHEEL.

---

The Schedule referred to in these Letters Patent and making part of the same.

---

TO ALL WHOM IT MAY CONCERN:

Be it known that I, ELISHA MATTESON, of South Brooklyn, in the county of Kings, and in the State of New York, have invented certain new and useful Improvements in Paddle-Wheels; and do hereby declare that the following is a full, clear, and exact description thereof, reference being had to the accompanying drawings, and to the letters of reference marked thereon.

In the annexed drawings, making part of this specification, A represents the shaft of the wheel, which is provided with four sets or series of arms and two series of paddles, two series of arms being used for each series of paddles. B B represent the arms and C C the paddles. The paddles of each set of arms incline toward a vertical plane, or plane drawn at right angles to the shaft B, at its centre, so that when the shaft revolves they collect the water. The inner end of each paddle stands at a position central between the two opposite paddles of the adjacent set of arms, so that the water collected is allowed to pass around the inner ends of the paddles without obstruction. The paddles are not all made of the same length. Supposing the longest paddles to be in a vertical line, over and beneath the shaft, the shortest are in a horizontal line, on each side of said shaft, that is, they gradually decrease nearly one-half in length to the end of the first quadrant, then gradually increase in length to the end of the second quadrant, then decrease to the third, and increase to the fourth.

The object of this arrangement is this: When the engine exerts the greatest power upon the pitman the longest paddles are dipping or operating in the water, but when the crank is upon its centres the shortest paddles are presented to the water, so that but little force is required to propel the wheel at this time. The power increases and decreases from centre to centre of the shaft-crank, and the paddles are made to increase and decrease in length to correspond with this increase and decrease of power.

This wheel may be used upon any of the steamboats now in use, whether side-wheel or stern-wheel.

Having thus fully described my invention, what I claim as new, and desire to secure by Letters Patent, is—

The use of two sets or series of paddles, inclining inward, and arranged to gather and discharge the water, while they are made of gradually increasing and decreasing length to correspond with the increasing and decreasing power of the crank, substantially as herein specified.

In testimony that I claim the foregoing I have hereunto set my hand and seal this        day of      , 1867

ELISHA MATTESON.

Witnesses:
C. M. ALEXANDER,
J. M. MASON.